United States Patent
Maruyama et al.

(10) Patent No.: US 10,336,138 B2
(45) Date of Patent: Jul. 2, 2019

(54) RUBBER COMPOSITION AND METHOD FOR PRODUCING SAME, CROSSLINKED RUBBER COMPOSITION, AND TIRE

(71) Applicant: BRIDGESTONE CORPORATION, Tokyo (JP)

(72) Inventors: Takayuki Maruyama, Tokyo (JP); Kazuya Murata, Tokyo (JP); Seiichi Kato, Tokyo (JP); Tomokatsu Ikuta, Saitama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/540,463

(22) PCT Filed: Feb. 5, 2016

(86) PCT No.: PCT/JP2016/000614
§ 371 (c)(1),
(2) Date: Jun. 28, 2017

(87) PCT Pub. No.: WO2016/125503
PCT Pub. Date: Aug. 11, 2016

(65) Prior Publication Data
US 2017/0368876 A1 Dec. 28, 2017

(30) Foreign Application Priority Data
Feb. 5, 2015 (JP) .................. 2015-021442

(51) Int. Cl.
| | |
|---|---|
| B60C 1/00 | (2006.01) |
| C08L 21/00 | (2006.01) |
| C08J 3/22 | (2006.01) |
| C08K 3/04 | (2006.01) |
| C08K 3/22 | (2006.01) |

(52) U.S. Cl.
CPC .................. *B60C 1/00* (2013.01); *C08J 3/22* (2013.01); *C08K 3/04* (2013.01); *C08K 3/22* (2013.01); *C08L 21/00* (2013.01); *C08K 2003/2296* (2013.01); *C08K 2201/003* (2013.01)

(58) Field of Classification Search
CPC .... C08K 3/22; C08K 3/04; C08K 2203/2296; C08L 21/00
See application file for complete search history.

(56) References Cited

U.S. PATENT DOCUMENTS 9,796,819 B2 * 10/2017 Nishiura .................. C08J 3/22
2007/0037917 A1    2/2007 Sandstrom

FOREIGN PATENT DOCUMENTS

| CN | 102453284 A | 5/2012 |
|---|---|---|
| CN | 104292521 A | 1/2015 |
| EP | 3135714 A1 | 3/2017 |
| JP | 2006-213791 A | 8/2006 |
| JP | 2008-013704 A | 1/2008 |
| JP | 2010-084102 A | 4/2010 |
| JP | 2010-285526 A | 12/2010 |
| JP | 2011-016874 A | 1/2011 |
| JP | 2011-032373 A | 2/2011 |
| JP | 2011-256373 A | 12/2011 |

OTHER PUBLICATIONS

Tingling Rao's Master of Science Thesis, 2012, University of Akron.*
Cam et al., Macromolecules 2004, 37, 5011-5017.*
Taghvaei-Ganjali et al. J. Appl. Polym. Sci. 2011, 122, 249-256.*
International Search Report of PCT/JP2016/000614 dated Apr. 19, 2016 [PCT/ISA/210].
Communication dated Jan. 18, 2018, from the European Patent Office in counterpart European Application No. 16746334.8.
Communication dated May 11, 2018 from the State Intellectual Property Office of the P.R.C. in counterpart Chinese application No. 201680009014.7.

* cited by examiner

*Primary Examiner* — Vu A Nguyen
(74) *Attorney, Agent, or Firm* — Sughrue Mion, PLLC

(57) ABSTRACT

As a rubber composition excellent in fatigue resistance and a method for producing the same, this disclosure provides a rubber composition containing a zinc oxide, wherein: a total volume of aggregates of the zinc oxide with a diameter of 20 μm or more is 0.008 or less in the rubber composition by volume fraction; and a method for producing the rubber composition, comprising: preparing a wet masterbatch by using a carbon black with a surface average acidic functional group amount (μeq/m$^2$) of 0.15 or more and less than 3.00, preferably 0.40 or more and less than 1.50; and compounding a zinc oxide with the wet masterbatch.

15 Claims, No Drawings

RUBBER COMPOSITION AND METHOD FOR PRODUCING SAME, CROSSLINKED RUBBER COMPOSITION, AND TIRE

CROSS REFERENCE TO RELATED APPLICATIONS

This application is a National Stage of International Application No. PCT/JP2016/000614, filed Feb. 5, 2016, claiming priority based on Japanese Patent Application No. 2015-021442, filed Feb. 5, 2015, the contents of all of which are incorporated herein by reference in their entirety.

TECHNICAL FIELD

This disclosure relates to a rubber composition and a method for producing the same, a crosslinked rubber composition, and a tire.

BACKGROUND

Conventionally, in a rubber composition using a diene rubber as a rubber component, a zinc oxide is used as a vulcanization accelerator aid for aiding the acceleration of the vulcanization of the rubber composition. The zinc oxide has a primary particle size of ordinarily 1 μm or less, but when compounding together with other compounding agents by using an internal mixer or open roll, such as Banbury mixer, kneader and the like, since its aggregability is strong, it is difficult to obtain excellent dispersibility in the rubber component, and aggregates of tens of μm are frequently seen. Such aggregates of zinc oxide become fracture nuclei, and thus become the reason for deterioration of reinforcement performance (breaking strength), wear resistance, rupture strength, etc. of the rubber composition.

Regarding this, in order to efficiently disperse the zinc oxide in the rubber component, suggested is a method for previously kneading merely a rubber component containing a natural rubber and/or a diene synthetic rubber, a carbon black, and a zinc oxide, to thereby prepare a masterbatch (see PTL 1 in the following), etc. According to this method, by dispersing the zinc oxide at nanolevel, it is possible to obtain a rubber masterbatch having improved reinforcement performance (breaking strength), wear resistance and rupture strength, and a rubber composition using the same.

CITATION LIST

Patent Literature

PTL 1: JP 2010-84102 A

SUMMARY

Technical Problem

As a result of intensive study, we discovered that according to the aforementioned PTL 1, by dispersing zinc oxide averagely at nanolevel, it is possible to improve the reinforcement performance (breaking strength), the wear resistance and the rupture strength of the rubber composition at some degree. However, the resistance (i.e., fatigue resistance) to a phenomenon that when the rubber is repeatedly exposed to a stress or strain of a degree so as to not cause fracture or breakage (fatigue loading) for a long period, the structure and the properties of the rubber are changed, which leads to fracture (fatigue fracture), has not been improved.

Then, this disclosure is to solve the problem of the aforementioned prior art, and is to provide a rubber composition excellent in fatigue resistance and a method for producing the same, and is to further provide a crosslinked rubber composition obtained by crosslinking such rubber composition.

Moreover, this disclosure is to provide a tire excellent in fatigue resistance.

Solution to Problem

The summary and construction of the rubber composition, the crosslinked rubber composition, the method for producing the rubber composition, and the tire of this disclosure for solving the aforementioned problem are as follows.

The rubber composition of this disclosure is a rubber composition containing a zinc oxide, wherein:
a total volume of aggregates of the zinc oxide with a diameter of 20 μm or more is 0.008 or less in the rubber composition by volume fraction.

Further, even when exposed to a stress or strain of a degree so as to not cause fracture or breakage (fatigue loading) for a long period, the rubber composition of this disclosure is unlikely to fracture, i.e., has an excellent fatigue resistance.

Here, "aggregates of the zinc oxide with a diameter of 20 μm or more" refers to masses having a diameter of 20 μm or more, which are generated due to the aggregation in the rubber component of the zinc oxide compounded in the rubber, formed in the rubber composition or the crosslinked rubber composition, and are inclusive of reaction products obtained via chemical change of a part of or the entire masses from zinc oxide to other matters (zinc sulfide, etc.).

Further, in the rubber composition of this disclosure, the total volume of the aggregates of the zinc oxide with a diameter of 20 μm or more in the rubber composition is measured with X-ray CT. More specifically, after obtaining a 3-dimensional CT image via X-ray CT at a voxel size that each side is 2.5 μm or less, the measurement is performed by extracting merely the defects (inclusion) with a diameter of 20 μm or more from the obtained data (volume (VOL) file) by using a defect analysis function of a commercially available X-ray CT analysis software (VGStudio MAX made by Volume Graphics, etc.), etc., and calculating the volume fraction of the defects from the total voxel number (total volume) of the extracted defect part and the voxel number of the entire analyzed region (the obtained volume fraction is defined as the volume fraction in the rubber composition of the total volume of the aggregates of the zinc oxide with a diameter of 20 μm or more). Here, the diameter of the aggregates of the zinc oxide refers to the diameter of a sphere circumscribing all the voxels for forming one extracted defect.

In the rubber composition of this disclosure, it is preferable that the total volume of the aggregates of the zinc oxide with a diameter of 20 μm or more is 0.007 or less in the rubber composition by volume fraction. In this case, the fatigue resistance is further improved.

The rubber composition of this disclosure preferably contains a carbon black with a surface average acidic functional group amount (μeq/m$^2$) of 0.15 or more and less than 3.00, and more preferably contains a carbon black with a surface average acidic functional group amount (μeq/m$^2$) of 0.40 or more and less than 1.50.

In this case, the aggregates of the zinc oxide with a diameter of 20 μm or more in the rubber composition are further reduced, and the fatigue resistance of the rubber composition is further improved.

The crosslinked rubber composition of this disclosure is formed by crosslinking the aforementioned rubber composition, and has a crosslink density of $4.5\times10^{-4}$ mol/cm$^3$ or less, preferably has a crosslink density of $3.1\times10^{-4}$ mol/cm$^3$ or less.

In this case, in the rubber composition after crosslinking, the size of high-hardness foreign matters with the aggregates of the zinc oxide as central nuclei is reduced, and the fatigue resistance of the rubber composition is further improved.

Here, in the crosslinked rubber composition of this disclosure, its crosslink density is measured as a total network density by compressive property of swollen rubber (see, e.g., Journal of the Society of Rubber Science and Technology, VOL. 63, No. 7 (1990), P440-448), which uses the theoretical formula by Flory.

The method for producing a rubber composition of this disclosure is a method for producing the aforementioned rubber composition, comprising:

preparing a wet masterbatch by using a carbon black with a surface average acidic functional group amount (μeq/m$^2$) of 0.15 or more and less than 3.00, preferably 0.40 or more and less than 1.50; and compounding a zinc oxide with the wet masterbatch.

According to the method for producing the rubber composition of this disclosure, it is possible to easily produce a rubber composition with a total volume of the aggregates of the zinc oxide with a diameter of 20 μm or more in the rubber composition of 0.008 or less by volume fraction.

The tire of this disclosure uses the aforementioned rubber composition or crosslinked rubber composition.

The tire of this disclosure uses the aforementioned rubber composition or crosslinked rubber composition, and thus has a high fatigue resistance in the used portions.

Advantageous Effect

According to this disclosure, it is possible to provide a rubber composition excellent in fatigue resistance and a method for producing the same, and to further provide a crosslinked rubber composition formed by crosslinking such rubber composition. Moreover, according to this disclosure, it is possible to provide a tire excellent in fatigue resistance.

DETAILED DESCRIPTION

<Rubber Composition and Crosslinked Rubber Composition>

Hereinafter, the rubber composition and the crosslinked rubber composition of this disclosure are described in details based on its embodiment.

The rubber composition of this disclosure contains a zinc oxide, wherein a total volume of aggregates of the zinc oxide with a diameter of 20 μm or more is 0.008 or less in the rubber composition by volume fraction.

As mentioned above, in a rubber composition containing a zinc oxide as a vulcanization accelerator aid, even when the zinc oxide is dispersed averagely at nanolevel according to the method as disclosed in the aforementioned PTL 1, the size of the aggregates of the zinc oxide has a distribution such that comparatively larger aggregates (with a diameter of 20 μm or more) exist by a certain amount (thousands in 1 mm$^3$). As a result of intensive study, we found that when crosslinking the rubber, such comparatively larger aggregates of zinc oxide become high-hardness foreign matters with the aggregates as central nuclei, and when larger than a certain size (about 50 μm), they are likely to become a source of initial crack when under fatigue loading. Regarding this, as a result of further study, we found that when a total volume of the aggregates of the zinc oxide with a diameter of 20 μm or more is 0.008 or less in the rubber composition by volume fraction, crack is unlikely to occur even when under fatigue loading, and it is possible to obtain a rubber composition excellent in fatigue resistance. Therefore, in the rubber composition of this disclosure, it is necessary that a total volume of the aggregates of the zinc oxide with a diameter of 20 μm or more is 0.008 or less, preferably 0.007 or less in the rubber composition by volume fraction. Moreover, the lower limit of the total volume of the aggregates of the zinc oxide with a diameter of 20 μm or more is not specifically limited. Although it is most preferable to contain no aggregates of the zinc oxide with a diameter of 20 μm or more, an ordinary value is 0.001 or more.

Here, the volume fraction of the total volume of the aggregates has a geometric correlation with the spacing between foreign matters. When the volume fraction is 0.008, the spacing between foreign matters is approximately equal to the diameter of the foreign matters. Namely, it is considered that assuming that the size of initial crack under fatigue loading is about two times to the diameter of the foreign matters, when the total volume of the aggregates is more than 0.008 by volume fraction, the spacing between foreign matters becomes narrower than the diameter of the foreign matters, which has a critical meaning that occurring initial cracks are connected, leading to fatigue fracture.

The crosslinked rubber composition of this disclosure is formed by crosslinking the aforementioned rubber composition, and has a crosslink density of $4.5\times10^{-4}$ mol/cm$^3$ or less, preferably $3.1\times10^{-4}$ mol/cm$^3$ or less, more preferably $2.8\times10^{-4}$ mol/cm$^3$ or less; and is preferably $1.9\times10^{-4}$ mol/cm$^3$ or more, more preferably $2.2\times10^{-4}$ mol/cm$^3$ or more. As mentioned above, when crosslinking the rubber, the aggregates of the zinc oxide with a diameter of 20 μm or more become high-hardness foreign matters with the aggregates as central nuclei, and when larger than a certain size (about 50 μm), they are likely to become a source of initial crack when under fatigue loading. Regarding this, if the crosslink density of the rubber composition after crosslinking is $4.5\times10^{-4}$ mol/cm$^3$ or less, the size of the high-hardness foreign matters formed during the crosslinking is likely to become less than about 50 μm, and thus a source of initial crack is unlikely to occur under fatigue loading, which further improves the fatigue resistance of the crosslinked rubber composition. Moreover, if the crosslink density of the crosslinked rubber composition obtained by crosslinking the rubber composition is $1.9\times10^{-4}$ mol/cm$^3$ or more, the strength of the crosslinked rubber composition is sufficiently high.

Here, regarding the aggregates of the zinc oxide with a diameter of less than 20 μm as well, if the crosslink density of the crosslinked rubber composition is more than $4.5\times10^{-4}$ mol/cm$^3$, the size of the high-hardness foreign matters formed during the crosslinking becomes more than about 50 μm, and a source of initial crack probably occurs under fatigue loading. However, if the total volume of the aggregates of the zinc oxide with a diameter of 20 μm or more is 0.008 or less in the rubber composition by volume fraction, initial crack such as to cause fatigue fracture does not occur, and thus it is possible to obtain a rubber composition and a crosslinked rubber composition excellent in fatigue resistance.

The zinc oxide used in the rubber composition of this disclosure is not specifically limited, but is preferably a zinc oxide with an average primary particle size of 10 to 200 nm (active zinc oxide) and a zinc oxide with an average primary particle size of 200 to 800 nm (industrial zinc oxide). A zinc oxide with an average primary particle size of 10 to 200 nm accelerates the vulcanization reaction of the rubber composition due to its basic property, and easily improves the productivity. On the other hand, a zinc oxide with an average primary particle size of 200 to 800 nm has a lower cost, and contributes to cost reduction of the rubber composition. Here, in this disclosure, the average primary particle size of the zinc oxide refers to an average particle size (specific surface area diameter) converted from a specific surface area measured through a BET method via nitrogen adsorption.

Moreover, the rubber composition of this disclosure preferably contains both a zinc oxide with an average primary particle size of 10 to 200 nm and a zinc oxide with an average primary particle size of 200 to 800 nm. In this case, it is possible to reduce the cost of the rubber composition, and simultaneously further improve the fatigue resistance of the rubber composition.

The rubber components of the rubber composition of this disclosure are not specifically limited, and are exemplified as either natural rubber (NR) or synthetic rubber. Here, the synthetic rubber is specifically exemplified as diene synthetic rubbers such as polybutadiene rubber (BR), synthesized polyisoprene rubber (IR), styrene-butadiene copolymer rubber (SBR), styrene-isoprene copolymer rubber (SIR) and the like. These rubber components may be used singly or as a blend of two or more.

In the rubber composition of this disclosure, the compounding amount of the zinc oxide is not specifically limited, but is preferably within a range of 1 to 20 parts by mass, more preferably 5 to 15 parts by mass per 100 parts by mass of the rubber component. If the compounding amount of the zinc oxide is 1 to 20 parts by mass per 100 parts by mass of the rubber component, it is possible to sufficiently aid the acceleration of the vulcanization of the rubber composition.

The rubber composition of this disclosure preferably contains 0.5 to 5 parts by mass, more preferably 1 to 3 parts by mass of a zinc oxide with an average primary particle size of 10 to 200 nm per 100 parts by mass of the rubber component. In this case, it is possible to accelerate the vulcanization reaction of the rubber composition, and to improve the productivity.

Moreover, the rubber composition of this disclosure preferably contains 1 to 15 parts by mass, more preferably 5 to 10 parts by mass of a zinc oxide with a primary particle size of 200 to 800 nm per 100 parts by mass of the rubber component. In this case, it is possible to reduce the cost of the rubber composition.

The rubber composition of this disclosure preferably further contains a carbon black. By containing a carbon black in the rubber composition, it is possible to improve the reinforcement performance (breaking strength), the wear resistance, the rupture strength, etc. of the rubber composition. The carbon black is exemplified as carbon blacks of various grades such as SAF, HAF, ISAF, FEF, GPF and the like, which may be used singly or by blending two or more.

Here, the rubber composition of this disclosure preferably contains a carbon black with a surface average acidic functional group amount ($\mu eq/m^2$) of 0.15 or more and less than 3.00, more preferably 0.40 or more and less than 1.50, as the carbon black. In the case where the rubber composition contains a carbon black with a surface average acidic functional group amount ($\mu eq/m^2$) of 0.40 or more, the aggregates of the zinc oxide with a diameter of 20 $\mu m$ or more is further reduced. On the other hand, in the case where the rubber composition contains a carbon black with a surface average acidic functional group amount ($\mu eq/m^2$) of more than 1.50, the vulcanization reaction becomes slow, which is unpreferable from the viewpoint of productivity. Further, from the viewpoint of reducing the aggregates of the zinc oxide with a diameter of 20 $\mu m$ or more, the surface average acidic functional group amount of the carbon black is more preferably 0.60 or more, even more preferably 0.70 or more.

Moreover, in this disclosure, the acidic functional group amount of the carbon black is measured with a method suggested by Boehm et al. as follows.

<Method by Boehm et al.>

Stir 10 g of the carbon black and 50 g of a $C_2H_5ONa$ aqueous solution of 0.01 mol/L in a flask for 2 hours, and leave standing for 22 hours at room temperature. After leaving standing, stir for 30 more minutes, and then filter and recover the filtrate. Subject 25 mL of the recovered filtrate to neutralization titration with an HCl aqueous solution of 0.01 mol/L, and measure the necessary HCl aqueous solution amount (mL) until the pH approaches 4.0. Calculate the acidic functional group amount (meq/kg) from the HCl aqueous solution amount and the following formula (1):

$$\text{Acidic functional group amount} = (25-\text{HCl aqueous solution amount}) \times 2 \qquad (1)$$

The surface average acidic functional group amount is a value obtained by dividing the acidic functional group amount measured with the aforementioned method with the nitrogen adsorption specific surface area ($N_2SA$), and is represented by an equivalent per unit area ($\mu eq/m^2$). Here, the nitrogen adsorption specific surface area is measured according to JIS K 6217 (1997).

From the viewpoint of the effect of colloidal property that the fatigue resistance is improved, the carbon black preferably has a dibutyl phthalate (DBP) oil absorption (mL/100 g) of 130 or less.

The method for introducing acidic functional groups to the carbon black is not specifically limited, and is exemplified as liquid phase oxidation treatment, gas phase oxidation treatment, etc., but is preferably performed via gas phase ozone treatment. Gas phase ozone treatment has a lower cost than liquid phase oxidation treatment, and is capable of efficiently introducing carboxyl groups. Here, the gas phase ozone treatment refers to oxidizing a dry carbon black by contacting the same with ozone gas. A gas phase ozone treated carbon black is exemplified as SBX45, made by Asahi Carbon Co., Ltd.

The gas phase ozone treatment of the carbon black is preferably performed by exposing dried carbon black to an ozone atmosphere of 0.1% or more and 16% or less. The treatment temperature during the oxidation treatment of the carbon black under ozone atmosphere is ordinary temperature to 100° C., and the treatment time is 10 to 300 seconds. This oxidation treatment of the carbon black is a method directly oxidizing dry carbon black with ozone gas, and thus does not need post-treatment (water washing and drying), and is efficient, simple, and capable of suppressing the cost.

In the rubber composition of this disclosure, the compounding amount of the carbon black is not specifically limited, but is preferably within a range of 10 to 100 parts by mass, more preferably within a range of 30 to 80 parts by mass, per 100 parts by mass of the rubber component. If the compounding amount of the carbon black is within a range of 10 to 100 parts by mass per 100 parts by mass of the rubber component, it is possible to sufficiently improve the reinforcement performance (breaking strength), the wear resistance, the rupture strength, etc., without deteriorating the processability of the rubber composition. If the compounding amount of the carbon black is lower than 10 parts by mass per 100 parts by mass of the rubber component, it is impossible to sufficiently improve the reinforcement performance (breaking strength), the wear resistance, the rupture strength, etc., and if higher than 100 parts by mass, the processability of the rubber composition is deteriorated, both of which are unpreferable.

The rubber composition of this disclosure preferably further contains a vulcanizing agent. The vulcanizing agent is exemplified as sulfur, etc.

The compounding amount of the vulcanizing agent is preferably within a range of 0.1 to 10.0 parts by mass, more preferably 0.5 to 5.0 parts by mass, per 100 parts by mass of the rubber component in terms of sulfur. If the compounding amount of the vulcanizing agent is 0.1 parts by mass or more in terms of sulfur, it is possible to sufficiently ensure the fracture strength, the wear resistance, etc. of the vulcanized rubber, and if 10.0 parts by mass or less, it is possible to sufficiently ensure the rubber elasticity.

The rubber composition of this disclosure preferably further contains a vulcanization accelerator. The vulcanization accelerator is not specifically limited, and is exemplified as thiazole vulcanization accelerators such as 2-mercapto benzothiazole (M), dibenzothiazyl disulfide (DM), N-cyclohexyl-2-benzothiazyl sulfenamide (CZ) and the like, guanidine vulcanization accelerators such as 1,3-diphenylguanidine (DPG) and the like, etc.

The compounding amount of the vulcanization accelerator is preferably within a range of 0.1 to 5.0 parts by mass, more preferably 0.2 to 3.0 parts by mass, per 100 parts by mass of the rubber component. If the compounding amount of the vulcanization accelerator is within a range of 0.1 to 5.0 parts by mass per 100 parts by mass of the rubber component, it is possible to appropriately accelerate the vulcanization of the rubber composition.

In the rubber composition of this disclosure, other than the zinc oxide, the rubber component, the carbon black, the vulcanizing agent, and the vulcanization accelerator, compounding agents ordinarily used in rubber industry, such as fillers other than carbon black such as silica and the like, softener, stearic acid, age resistor (antioxidant), may be appropriately selected and compounded as well, as long as not impairing the purpose of this disclosure or other required rubber performances. These compounding agents are preferably commercially available ones.

Starting with the tire mentioned below, the rubber composition of this disclosure may be used in various rubber products such as anti-vibration rubber, belt, hose and the like.

<Method for Producing Rubber Composition>

Next, the method for producing a rubber composition of this disclosure is described in details based on its embodiment.

The method for producing a rubber composition of this disclosure is a method for producing the aforementioned rubber composition, comprising: preparing a wet masterbatch by using a carbon black with a surface average acidic functional group amount ($\mu eq/m^2$) of 0.15 or more and less than 3.00; and compounding a zinc oxide with the wet masterbatch.

Here, the aforementioned crosslinked rubber composition of this disclosure may be produced by further crosslinking (vulcanizing) a rubber composition produced with the method of this disclosure.

Before compounding the zinc oxide, by preparing the wet masterbatch by using the carbon black with a surface average acidic functional group amount ($\mu eq/m^2$) of 0.15 or more and less than 3.00, it is possible to previously improve the dispersibility of the carbon black in the rubber component, and by compounding the zinc oxide with the wet masterbatch with a high dispersibility of carbon black, the dispersibility of the zinc oxide is improved, and it is possible to easily produce a rubber composition with a total volume of the aggregates of the zinc oxide with a diameter of 20 μm or more of 0.008 or less in the rubber composition by volume fraction.

The step for preparing the wet masterbatch includes, e.g., dispersing a carbon black with a surface average acidic functional group amount ($\mu eq/m^2$) of 0.15 or more and less than 3.00 in water, etc. to prepare a slurry solution, preparing a mixture by blending the slurry solution with a rubber latex solution in liquid phase, and drying the mixture.

The carbon black used in the step for preparing the slurry solution preferably has a surface average acidic functional group amount ($\mu eq/m^2$) of 0.15 or more and less than 3.00, preferably 0.40 or more and less than 1.50. If the surface average acidic functional group amount is 0.40 or more, it is possible to finely distribute the particle size of the slurry solution, and if the surface average acidic functional group amount is less than 1.50, it is possible to maintain sufficient vulcanization reactivity of the rubber composition. Further, from the viewpoint of fine particle size distribution of the slurry solution and maintenance of the vulcanization reactivity of the rubber composition, the surface average acidic functional group amount of the carbon black is preferably 0.60 or more and less than 1.50, more preferably 0.70 or more and less than 1.50.

In preparation of the water-dispersed slurry solution of the carbon black, rotor-stator type high shear mixer, high pressure homogenizer, ultrasonic homogenizer, colloidal mill, etc. may be used. For example, the slurry solution may be prepared by adding a predetermined amount of carbon black and water into a colloidal mill, and stirring at a high speed for a certain period. Here, the concentration of the carbon black in the slurry solution is preferably within a range of 0.1 to 30 mass % of the slurry solution.

In the aforementioned slurry solution, the carbon black in the slurry solution preferably has a median particle size (mv) of 2.5 μm or less and a 90% particle size (D90) of 3.0 μm or less, more preferably has a median particle size (mv) of 0.7 μm or less and a 90% particle size (D90) of 1.0 μm or less. Here, the median particle size (mv) and the 90% particle size (D90) are values measured by using a laser diffraction particle size analyzer, with 1.33 as the refractive index of water, and 1.57 as the refractive index of carbon black. If the median particle size (mv) of the carbon black in the slurry solution is 2.5 μm or less and the 90% particle size (D90) is 3.0 μm or less, it is possible to improve the dispersibility of the carbon black in the mixed liquor of the rubber latex solution and the slurry solution, and to improve the heat buildup of the wet masterbatch.

In the step for preparing the mixture, the mixed liquor of the dispersed slurry solution of the carbon black and the rubber latex solution containing the rubber component is prepared.

Here, the rubber latex solution is exemplified as natural rubber latex, synthetic rubber latex, organic solvent solution of synthetic rubber obtained via solution polymerization, etc. Among these, from the viewpoint of performances and easiness of production of the obtained wet masterbatch, natural rubber latex and synthetic rubber latex are preferable. Further, the concentration of the rubber component in the rubber latex solution is preferably within a range of 5 to 40 mass %.

As the natural rubber latex, any one of field latex, ammonia treated latex, centrifugation concentrated latex, deproteinized latex treated with enzyme, or a combination of the aforementioned ones may be used.

Moreover, as the synthetic rubber latex, latexes of those such as styrene-butadiene copolymer rubber, synthesized polyisoprene rubber, polybutadiene rubber and the like may be used.

The method for blending the slurry solution and the rubber latex solution is exemplified as adding the slurry solution into a homomixer, dripping the rubber latex solution and simultaneously stirring, or conversely, stirring the rubber latex solution and simultaneously dripping the slurry solution into it. Moreover, a method blending a slurry flow and a latex flow at a constant flow rate ratio under strong hydraulic stirring may be used as well. Further, a method blending a slurry flow and a latex flow by using a static mixer or a high shear mixer may be used as well.

The method for coagulating the wet masterbatch after performing the aforementioned blending is performed by using, e.g., coagulants such as acids such as formic acid, sulfuric acid, and salts such as sodium chloride and the like, similarly as ordinary. Moreover, in this disclosure, there are cases that coagulation is performed by blending the slurry solution and the rubber latex solution without adding a coagulant.

In the step for drying the mixture, ordinary driers such as vacuum drier, air drier, drum drier, band drier and the like may be used, but in order to further improve the dispersibility of the carbon black, it is preferably to perform the drying simultaneously with exerting a mechanical shear force. By performing the drying simultaneously with exerting a mechanical shear force, it is possible to obtain a rubber composition excellent in processability, reinforcement performance and rubber physical properties. The drying may be performed by using an ordinary kneading machine, but from the viewpoint of industrial productivity, it is preferable to use a continuous kneading machine, more preferable to use a same direction rotating or different direction rotating multi screw kneading extruder, even more preferable to use a twin screw kneading extruder.

In the step for compounding the zinc oxide, as mentioned above, the zinc oxide is added into the prepared wet masterbatch and kneaded. In this case, together with the zinc oxide, softener, stearic acid, age resistor, etc. may be compounded as long as not impairing the purpose of this disclosure or other required rubber performances, while it is preferable to add and knead a vulcanizing agent and a vulcanization accelerator singly at a lower temperature, e.g., 90° C. to 120° C. By sufficiently uniformly dispersing the zinc oxide in the wet masterbatch containing the rubber component, and then compounding the vulcanizing agent and the vulcanization accelerator at a lower temperature, it is possible to prevent premature vulcanization (scorching) of the rubber composition. Here, the compounding amount of the zinc oxide in the obtained rubber composition is as mentioned in the item "Rubber composition" in the above.

The rubber composition kneaded as mentioned above may be further subjected to warming, extrusion, crosslinking (vulcanization), etc., to obtain a crosslinked rubber composition (vulcanized rubber).

The warming conditions are not specifically limited, and various conditions such as warming temperature, warming time, warming apparatus and the like may be appropriately selected depending on the purpose. The warming apparatus is exemplified as mill, etc. ordinarily used for warming rubber compositions.

The extrusion conditions are not specifically limited, and various conditions such as extrusion time, extrusion rate, extrusion apparatus, extrusion temperature and the like may be appropriately selected according to the purpose. The extrusion apparatus is exemplified as extruder, etc. ordinarily used for extrusion of rubber compositions for tire. The extrusion temperature may be appropriately decided.

The apparatus, method, conditions, etc. for performing the crosslinking (vulcanization) are not specifically limited, and may be appropriately selected according to the purpose. The apparatus for performing the crosslinking (vulcanization) is exemplified as a vulcanizing molding machine, etc. based on a mold ordinarily used in vulcanization of rubber compositions for tire.

<Tire>

The tire of this disclosure uses the aforementioned rubber composition or crosslinked rubber composition. The tire of this disclosure has a high fatigue resistance on the portions on which the rubber composition or crosslinked rubber composition is used. Here, the portions of the tire on which the rubber composition or crosslinked rubber composition is used is exemplified as side wall, tread, case member, etc.

Depending on the type of the applied tire, the tire of this disclosure may be obtained via vulcanization after molding by using an unvulcanized rubber composition, or molding by using a half-crosslinked rubber composition (half-vulcanized rubber) subjected to prevulcanization, etc., and then perform regular vulcanization. Here, the tire of this disclosure is preferably a pneumatic tire, and the gas filled in the pneumatic tire may be ordinary air, air with adjusted oxygen partial pressure, or inactive gases such as nitrogen, argon, helium and the like.

EXAMPLES

This disclosure will be explained in further detail below according to examples, while this disclosure is not limited to the examples below.

Examples 1 and 2

<Carbon Black>

According to an oil furnace method, which is a well-known method for producing a carbon black published in the following document, obtained was a carbon black A, of which the dibutyl phthalate (DBP) oil absorption is 89.7 mL/100 g, the nitrogen adsorption specific surface area ($N_2SA$) is 114.8 $m^2/g$, the acidic functional group amount is 85.8 meq/kg, and the surface average acidic functional group amount is 0.747 µeq/$m^2$.

[Reference] "*Handbook of Carbon Black, 3rd Edition*", Carbon Black Association

<Preparation of Slurry Solution>

The slurry solution was prepared by adding the aforementioned carbon black A into water at a ratio of 5 mass %, and finely dispersing the same by using a high shear mixer made by Silverson. The particle size distribution of the carbon black in the slurry solution obtained here was 0.6 μm by median particle size (mv), and 1.5 μm by 90% particle size (D90).

<Preparation of Wet Masterbatch>

By stirring and simultaneously blending 3.5 kg of the aforementioned slurry solution and 3 kg of a concentrated natural rubber latex diluted to 10 mass %, coagulating while controlling the pH at 4.5 by using formic acid, washing, and then drying by using a twin screw extruder [KTX30, made by Kobe Steel Ltd.], the wet masterbatch A was obtained. In the wet masterbatch A, the content of the carbon black per 100 parts by mass of the rubber component was 54 parts by mass.

By using the obtained wet masterbatch A, compounding according to the formulation as shown in Table 1 by using a Banbury mixer with an internal volume of 50 L, performing crosslinking (vulcanization) at 145° C. for 60 minutes, crosslinked rubber compositions (a) and (b) were obtained.

Comparative Examples 1 and 2

By compounding according to the formulation as shown in Table 1 by using a Banbury mixer with an internal volume of 50 L, performing crosslinking (vulcanization) at 145° C. for 60 minutes, crosslinked rubber compositions (c) and (d) were obtained.

Example 3

By using the aforementioned slurry solution and the aforementioned concentrated natural rubber latex diluted to 10 mass %, the wet masterbatch B was obtained similarly as Examples 1 and 2, except that it is blended such that the content of the carbon black is 66 parts by mass per 105 parts by mass of the rubber component.

By using the obtained wet masterbatch B, compounding according to the formulation as shown in Table 1 by using a plasto mill with an internal volume of 2.5 L, and performing crosslinking (vulcanization) at 145° C. for 60 minutes, a crosslinked rubber composition (e) was obtained.

Example 4

By using the aforementioned wet masterbatch B, compounding according to the formulation as shown in Table 1 by using a Banbury mixer with an internal volume of 50 L, and performing crosslinking (vulcanization) at 145° C. for 60 minutes, a crosslinked rubber composition (f) was obtained.

Example 5

By performing the same operation as Example 4, a crosslinked rubber composition (g) was obtained.

Example 6

According to the oil furnace method, which is a well-known method for producing a carbon black published in the document above, obtained was a carbon black B, of which the dibutyl phthalate (DBP) oil absorption is 75 mL/100 g, the nitrogen adsorption specific surface area ($N_2SA$) is 84 m$^2$/g, the acidic functional group amount is 27.5 meq/kg, and the surface average acidic functional group amount is 0.327 μeq/m$^2$.

By using the obtained carbon black B, compounding according to the formulation as shown in Table 1 by using a Banbury mixer with an internal volume of 50 L, and performing crosslinking (vulcanization) at 145° C. for 60 minutes, a crosslinked rubber composition (h) was obtained.

<Evaluation of Rubber Composition>

Regarding the aforementioned crosslinked rubber composition (e), fatigue resistance test was performed according to the following method, and further, the total volume of the aggregates of the zinc oxide and the crosslink density were measured. Regarding the aforementioned crosslinked rubber composition (a), fatigue resistance test was performed according to the following method, and further, the total volume of the aggregates of the zinc oxide was measured. Regarding the aforementioned crosslinked rubber composition (c), fatigue resistance test at a maximum stress of 1.5 MPa was performed according to the following method, and further, the total volume of the aggregates of the zinc oxide was measured. Regarding the aforementioned crosslinked rubber compositions (f), (g) and (h), fatigue resistance test at a maximum stress of 2.4 MPa was performed according to the following method, and further, the total volume of the aggregates of the zinc oxide and the crosslink density were measured. The results were as shown in Table 1.

(1) Evaluation of Fatigue Resistance

In the fatigue resistance test, a hydraulic type fatigue testing machine, a servo pulser EHF-E series made by Shimadzu Corporation Ltd. was used. Used as a specimen was a test piece in a strip form with a width of 6.0 mm, a length of 40 mm and a thickness of 2.0 mm, and with an initial crack with a length of 0.5 mm made on its center. The specimen was applied with a constant repeated stress which forms a sine function with respect to the time at a frequency of 5 Hz, with a maximum stress of 1.0 to 3.0 MPa and a minimum stress of 0.1 MPa in the tensile direction of the specimen, and the numbers of times until the specimen fractures with respect to each maximum stress were measured.

(2) Measurement of Total Volume of Aggregates of Zinc Oxide

The total volume (volume fraction) of the aggregates of the zinc oxide with a diameter of 20 μm or more was measured with X-ray CT.

Used as the measurement apparatus with respect to the crosslinked rubber compositions (a) to (d) was phoenix nanotom (tungsten target) made by GE Sensing & Inspection Technologies. Moreover, used with respect to crosslinked rubber compositions (e) to (h) was SMX-160CT-SV3 (tungsten target) made by Shimadzu Corporation.

As a measurement sample, a sample cut out from the aforementioned crosslinked rubber composition in a rectangular shape with a cross section with an angle of approximately 1 mm and a height of approximately 5 mm was made. After arranging the aforementioned sample sufficiently closely to an X-ray tube (X-ray source) formed with the tungsten target such that each side of the voxel size is 2.5 μm or less, a 3-dimensional CT image was obtained by irradiating from the side of the sample.

(3) Measurement of Crosslink Density

The crosslink density of the crosslinked rubber composition was measured as a total network density by compressive property of swollen rubber (see, e.g., Journal of the Society of Rubber Science and Technology, VOL. 63, No. 7 (1990), P440-448), which uses the theoretical formula by Flory. Regarding the crosslinked rubber composition (a), the crosslink density is measured according to the above-described method. Regarding the crosslinked rubber compositions (b) and (d), fatigue resistance test is performed, and further, the total volume of the aggregates of the zinc oxide and the crosslink density are measured according to the above-described methods. Regarding the crosslinked rubber composition (c), fatigue resistance test at a maximum stress of 2.1 MPa is performed, and further, the crosslink density is measured according to the above-described methods. Regarding the crosslinked rubber compositions (f), (g) and (h), fatigue resistance test at a maximum stress of 1.8 MPa is performed according to the above-described method. In Table 1, the total volumes of the aggregates of the zinc oxide with a diameter of 20 μm or more of Example 2 and Comparative Example 2, the numbers of times until the specimen fractures at a maximum stress of 2.1 MPa of Comparative Example 1, and the numbers of times until the specimen fractures at a maximum stress of 1.8 MPa of Examples 4-6 are data of prophetic examples.

TABLE 1

| | | | Example 1 | Example 2 | Comparative Example 1 | Comparative Example 2 |
|---|---|---|---|---|---|---|
| Prepared crosslinked rubber composition | | | (a) | (b) | (c) | (d) |
| Formulation | Wet masterbatch A | Parts by mass | 154 | 154 | — | — |
| | Wet masterbatch B | | — | — | — | — |
| | Natural rubber | | — | — | 100 | 100 |
| | Carbon black A *1 | | — | — | 54 | 54 |
| | Carbon black B *2 | | — | — | — | — |
| | Zinc oxide *3 | | 8 | 8 | 8 | 8 |
| | Active zinc oxide *4 | | 2 | — | 2 | 2 |
| | Age resistor *5 | | 1 | 1 | 1 | 1.5 |
| | Sulfur | | 5.0 | 5.0 | 5.0 | 5.0 |
| | Vulcanization accelerator *6 | | 0.6 | 0.6 | 0.6 | 0.6 |
| Physical properties | Total volume of aggregates with a diameter of 20 μm or more | Volume fraction | 0.0061 | 0.0058 | 0.0130 | 0.0151 |
| | Crosslink density | $\times 10^{-4}$ (mol/cm$^3$) | 3.1 | 2.9 | 1.9 | 2.2 |
| Evaluation | Fatigue resistance (Number of times until fracture) | Maximum stress 1.5 MPa | Number of times | 1,010,000 times | 1,310,000 times | 91,000 times | 75,000 times |
| | | Maximum stress 1.8 MPa | | — | — | — | — |
| | | Maximum stress 2.1 MPa | | 240,000 times | 400,000 times | 7,500 times | 6,800 times |
| | | Maximum stress 2.4 MPa | | — | — | — | — |

| | | | Example 3 | Example 4 | Example 5 | Example 6 |
|---|---|---|---|---|---|---|
| Prepared crosslinked rubber composition | | | (e) | (f) | (g) | (h) |
| Formulation | Wet masterbatch A | Parts by mass | — | — | — | — |
| | Wet masterbatch B | | 171 | 171 | 171 | — |
| | Natural rubber | | — | — | — | 100 |
| | Carbon black A *1 | | — | — | — | — |
| | Carbon black B *2 | | — | — | — | 61 |
| | Zinc oxide *3 | | 6 | 6 | 6 | 6 |
| | Active zinc oxide *4 | | 4 | 4 | 4 | 4 |
| | Age resistor *5 | | 0.5 | 0.5 | 0.5 | 0.5 |
| | Sulfur | | 7.5 | 7.5 | 7.5 | 7.5 |
| | Vulcanization accelerator *6 | | 0.8 | 0.8 | 0.8 | 0.8 |
| Physical properties | Total volume of aggregates with a diameter of 20 μm or more | Volume fraction | 0.0008 | 0.0048 | 0.0056 | 0.0076 |
| | Crosslink density | $\times 10^{-4}$ (mol/cm$^3$) | 4.0 | 4.5 | 4.3 | 4.3 |
| Evaluation | Fatigue resistance (Number of times until fracture) | Maximum stress 1.5 MPa | Number of times | — | — | — | — |
| | | Maximum stress 1.8 MPa | | 930,000 times | 640,000 times | 620,000 times | 400,000 times |
| | | Maximum stress 2.1 MPa | | — | — | — | — |

TABLE 1-continued

| | | | | |
|---|---|---|---|---|
| Maximum stress 2.4 MPa | 310,000 times | 250,000 times | 190,000 times | 120,000 times |

*1 Carbon black A: the same carbon black used for preparing the wet masterbatchs A and B, dibutyl phthalate (DBP) oil absorption = 89.7 mL/100 g, nitrogen adsorption specific surface area ($N_2SA$) = 114.8 $m^2$/g, acidic functional group amount = 85.8 meq/kg, surface average acidic functional group amount = 0.747 μeq/$m^2$
*2 Carbon black B: dibutyl phthalate (DBP) oil absorption = 75 mL/100 g, nitrogen adsorption specific surface area ($N_2SA$) = 84 $m^2$/g, acidic functional group amount = 27.5 meq/kg, surface average acidic functional group amount = 0.327 μeq/$m^2$
*3 Zinc oxide: trade name "Zinc Oxide No. 2", made by Hakusui Tech Co., Ltd., average primary particle size = 400 nm
*4 Active zinc oxide: trade name "AZO", made by Seido Chemical Industry, average primary particle size = 20 nm
*5 Age resistor: N-1,3-dimethylbutyl-N'-phenyl paraphenylenediamine, trade name "Santoflex 6-PPD", made by Flexsys
*6 Vulcanization accelerator: N-cyclohexyl-2-benzothiazyl sulfenamide, trade name "Santocure CBS", made by Flexsys From Table 1, it is understood that as compared to the rubber compositions of the comparative examples with a total volume of the aggregates of the zinc oxide with a diameter of 20 μm or more of more than 0.008 by volume fraction, the rubber compositions of the examples with a total volume of the aggregates of the zinc oxide with a diameter of 20 μm or more of 0.008 or less by volume fraction have a higher number of time of repeated load of stress until fracture, and are more excellent in fatigue resistance.

INDUSTRIAL APPLICABILITY

The rubber composition and the crosslinked rubber composition of this disclosure may be applied to tires and other rubber products. Moreover, the method for producing a rubber composition of this disclosure may be applied for producing such rubber composition. Further, the tire of this disclosure may be applied as tires for various vehicles.

The invention claimed is:

1. A rubber composition containing a zinc oxide and a carbon black having a surface average acidic functional group amount (μeq/$m^2$) of 0.15 or more and less than 3.00, wherein:
   the zinc oxide comprises both a zinc oxide having an average primary particle size of 10 to 200 nm and zinc oxide having an average primary particle size of 200 to 800 nm, and
   a total volume of aggregates of the zinc oxide with a diameter of 20 μm or more is 0.008 or less in the rubber composition by volume fraction.

2. The rubber composition according to claim 1, wherein:
   the total volume of the aggregates of the zinc oxide with a diameter of 20 μm or more is 0.007 or less in the rubber composition by volume fraction.

3. The rubber composition according to claim 1, wherein the carbon blacker has a surface average acidic functional group amount (μeq/$m^2$) of 0.40 or more and less than 1.50.

4. A crosslinked rubber composition formed by crosslinking the rubber composition according to claim 1, wherein:
   a crosslink density is $4.5 \times 10^{-4}$ mol/$cm^3$ or less.

5. The crosslinked rubber composition according to claim 4, wherein:
   the crosslink density is $3.1 \times 10^{-4}$ mol/$cm^3$ or less.

6. A method for producing the rubber composition according to claim 1, comprising:
   preparing a wet masterbatch by using a carbon black with a surface average acidic functional group amount (μeq/$m^2$) of 0.15 or more and less than 3.00; and
   compounding both a zinc oxide having an average primary particle size of 10 to 200 nm and a zinc oxide having an average primary particle size of 200 to 800 nm with the wet masterbatch.

7. A method for producing the rubber composition according to claim 1, comprising:
   preparing a wet masterbatch by using a carbon black with a surface average acidic functional group amount (μeq/$m^2$) of 0.40 or more and less than 1.50; and
   compounding both a zinc oxide having an average primary particle size of 10 to 200 nm and a zinc oxide having an average primary particle size of 200 to 800 nm with the wet masterbatch.

8. A tire comprising a cross-linked rubber composition obtained by crosslinking the rubber composition according to claim 1.

9. The rubber composition according to claim 2, wherein the carbon black has a surface average acidic functional group amount (μeq/$m^2$) of 0.40 or more and less than 1.50.

10. A crosslinked rubber composition formed by crosslinking the rubber composition according to claim 2, wherein:
    a crosslink density is $4.5 \times 10^{-4}$ mol/$cm^3$ or less.

11. A method for producing the rubber composition according to claim 2, comprising:
    preparing a wet masterbatch by using a carbon black with a surface average acidic functional group amount (μeq/$m^2$) of 0.15 or more and less than 3.00; and
    compounding both a zinc oxide having an average primary particle size 10 to 200 nm and a zinc oxide having an average primary particle size of 200 to 800 nm with the wet masterbatch.

12. A method for producing the rubber composition according to claim 2, comprising:
    preparing a wet masterbatch by using a carbon black with a surface average acidic functional group amount (μeq/$m^2$) of 0.40 or more and less than 1.50; and
    compounding both a zinc oxide having an average primary particle size of 10 to 200 nm and a zinc oxide having an average primary particle size of 200 to 800 nm with the wet masterbatch.

13. A tire comprising a cross-linked rubber composition obtained by crosslinking the rubber composition according to claim 2.

14. A crosslinked rubber composition formed by crosslinking the rubber composition according to claim 3, wherein:
    a crosslink density is $4.5 \times 10^{-4}$ mol/$cm^3$ or less.

15. A method for producing the rubber composition according to claim 3, comprising:
    preparing a wet masterbatch by using a carbon black with a surface average acidic functional group amount (μeq/$m^2$) of 0.40 or more and less than 1.50; and
    compounding both a zinc oxide having an average primary particle size of 10 to 200 nm and a zinc oxide having an average primary particle size of 200 to 80 nm with the wet masterbatch.

* * * * *